United States Patent [19]

Ambros et al.

[11] Patent Number: 4,555,533

[45] Date of Patent: Nov. 26, 1985

[54] BONDING ASSISTANT FOR A SUPPORT MATERIAL

[75] Inventors: Peter Ambros, Hohenroth; Erich Gatzke, Bad Neustadt, both of Fed. Rep. of Germany

[73] Assignee: Preh Elektrofeinmechanische Werke Jakob Preh Nachf. GmbH & Co., Bad Neustadt, Fed. Rep. of Germany

[21] Appl. No.: 284,209

[22] Filed: Jul. 17, 1981

[30] Foreign Application Priority Data

Jul. 26, 1980 [DE] Fed. Rep. of Germany ....... 3028496

[51] Int. Cl.$^4$ .......................... C08L 3/00; C08K 3/34; C08K 3/18; H05K 3/38
[52] U.S. Cl. .................... 523/440; 523/442; 523/443; 523/459; 523/466; 523/514; 523/516; 523/521; 523/523; 524/413; 524/423; 524/430; 524/432; 524/433; 524/445; 524/451; 524/507; 524/539; 524/542; 524/589
[58] Field of Search ............ 525/124, 438, 440; 260/40 R, 40 TN, 37 EP, 37 N, 39 R, 39 M, 39 SB; 523/442, 443, 459, 466, 440, 514, 516, 521, 523; 524/413, 423, 430, 432, 433, 589, 445, 451, 507, 539, 542

[56] References Cited

U.S. PATENT DOCUMENTS

| | | | |
|---|---|---|---|
| Re. 29,699 | 7/1978 | Kelly et al. | 428/414 |
| 3,896,076 | 7/1975 | Watanabe et al. | 260/40 R |
| 3,936,575 | 2/1976 | Watanabe et al. | 428/418 |
| 3,993,849 | 11/1976 | Victorius | 525/124 |
| 4,101,486 | 7/1978 | Bosso et al. | 523/415 |
| 4,150,211 | 4/1979 | Muller et al. | 525/124 |
| 4,169,825 | 10/1979 | Yapp et al. | 525/438 |
| 4,222,929 | 9/1980 | Shanoski et al. | 523/521 |
| 4,246,380 | 1/1981 | Gras et al. | 525/440 |
| 4,281,038 | 7/1981 | Ambros et al. | 524/621 |
| 4,293,659 | 10/1981 | Svoboda | 523/500 |
| 4,294,940 | 10/1981 | Hino et al. | 525/124 |
| 4,307,153 | 12/1981 | Bernelin et al. | 525/438 |
| 4,391,742 | 7/1983 | Steigerwald et al. | 524/435 |
| 4,413,079 | 11/1983 | Disteldorf et al. | 525/457 |
| 4,454,264 | 6/1984 | Patzschke et al. | 523/415 |
| 4,476,261 | 10/1984 | Patzschke et al. | 523/415 |

FOREIGN PATENT DOCUMENTS 2044484  9/1970  Fed. Rep. of Germany .

OTHER PUBLICATIONS

C.A. 92-148661m, Yoshinobu et al, (J79-132633).

Primary Examiner—Herbert J. Lilling
Attorney, Agent, or Firm—Kane, Dalsimer, Kane, Sullivan and Kurucz

[57] ABSTRACT

A bonding assistant for a support material consists of an organic binder which comprises a mixture of a saturated polyester and an isophorone diisocyanate containing masked isocyanate groups apart from OH groups, said mixture being present in a proportion of from 50 to 80 percent by weight of the total mixture, the binder having filler particles of a particle size less than 15 μm dispersed therein in a proportion of from 10 to 50 percent by weight.

3 Claims, No Drawings

BONDING ASSISTANT FOR A SUPPORT MATERIAL

BACKGROUND OF THE INVENTION

1. Field of the Invention

The invention relates to a bonding assistant for a support material, consisting of an organic binder.

2. Brief Description of the Prior Art

The problem of adherence arises especially in the manufacture of conductor paths in printed circuits. In practice a plurality of methods of manufacturing these printed circuits already exist. Apart from the subtractive method, also the additive or the semiadditive method, respectively, are widely used. In all methods of additive build-up which have already become known, a bonding assistant is needed which is to insure adherence between the support material or substrate and the additively built-up metal layer, being in most cases a copper layer, even if these methods are distinguished by different process steps. This requirement applies especially when the conductors paths, as usual, are to be solderable. The bonding assistant itself is a thermosetting adhesive, generally on the basis of an acrylonitrile-/butadiene copolymer, i.e. a nitrile rubber which is cured with a heat-reactive phenolic compound. To obtain sufficient bond strength with respect to the copper coating on the substrate, the bonding assistant often is subjected to a chemical etching treatment. Thereafter, e.g., the support material is activated in the usual manner and then chemically copper-plated. Thereafter a negative image is formed in a manner known per se by screen or photo-printing. By subsequent galvanic copper-plating the desired conductor path thickness can be obtained. To obtain a still better bond strength, it is often required to subject the support material coated with the bonding assistant also to a mechanical roughening treatment.

For example, a method for producing a printed circuit is known (German OS No. 16 40 635), wherein the substrate is provided with a layer of bonding assistant. This layer consists of a mixture of a curable resin such as epoxide or phenolic resin in combination with fine-grained aggregate such as silicates or metal oxides. The layer of bonding assistant is cured at least partially or completely, whereby adherence to the surface of the substrate is insured. Prior to the application of the conductive metal layer, the layer of bonding assistant is subjected to a chemical digestion. Prior to digestion the layer of bonding assistant can be subjected to a mechanical roughening treatment. By this treatment the aggregate particles are partially ground, and during subsequent digestion they are removed by dissolution without the resin portion being affected. Thus a surface provided with holes and undercuts is formed. Onto this surface the conductive metal layer is deposited galvanically. Chemical digestion is effected by means of sodium hydroxide, weak acids or organic solvents. This process step involves a loss of etchant necessary for the digestion process, quite apart from the sewage problems. In addition, precise guidance of the bath with continuous process control and frequent bath renewals are required.

A further method for producing a printed circuit, using the additive technique, is known (German AS No. 20 44 484), in which a bonding assistant is interposed between copper layer and substrate. This bonding assistant is composed of acrylonitrile butadiene and phenolic resin, dissolved in methylethyl ketone. After drying for two hours and a half at 140° C. the bonding assistant exhibits a surface resistance of $10^5$ to $10^8$ megohms. Prior to copper-plating, the bonding assistant is partially etched by means of a mixture of sulfuric acid, water and chromic acid. By this activation the butadiene component is oxidatively affected more rapidly than the two other components. Thus a molecular hole is formed at the points where a butadiene chain is present, in which thereafter the chemically deposited copper can be anchored.

SUMMARY OF THE INVENTION

It is the object of the present invention to find a bonding assistant of the type defined initially, which can be used not only for hard paper as support material, but also for a high temperature resistant thermoplastic.

This problem is solved according to the invention in that the binder comprises a mixture of a saturated polyester and an isophorone diisocyanate containing masked isocyanate groups apart from OH groups, said mixture being present in a proportion of from 50 to 80 percent by weight of the total mixture, and that the binder has filler particles of a particle size less than 15 $\mu$m dispersed therein in a proportion of from 10 to 50 percent by weight.

Further advantageous embodiments of the invention can be seen from the sub-claims.

DETAILED DESCRIPTION OF THE PREFERRED EMBODIMENTS OF THE INVENTION

According to the invention the bonding assistant is used especially in the manufacture of printed circuits made by the additive technique. Apart from the epoxy or phenolic resin laminates usually being used in electronics, also high temperature resistant thermoplastics can be used as support material.

Suitable plastics are polyphenylene sulfide, polyphenylene oxide, polyimide, polyphenylene sulfoxide, polyether sulfone or polyethylene sulfone, for example. These plastics adapted to be processed to substrates by injection molding afford the advantage that also a third dimension in the form of projections, for example, can be injection molded integrally therewith, which serve as mounting aids for structural elements or as other fixtures. A further advantage associated with the use of high temperature resistant thermoplastics lies in the fact that the water absorption of these materials is very low, which is important, e.g., for metallization in chemical baths. As tests have shown, the inventive bonding assistant is excellently suited especially for this latter type of support material.

The bonding assistant is applied to the support material by means of screen printing, spraying, dipping, centrifugal or roller cotaing techniques and is cured within a temperature range of from 180° to 250°. The bonding assistant consists of an organic binder being a mixture of a saturated polyester and an isophorone diisocyanate, each constituent containing masked isocyanate groups in addition to OH groups. In total the proportion of binder in the total mixture amounts to from 50 to 80 percent by weight. This binder additionally has filler particles of a particle size less than 15 $\mu$m dispersed therein in a proportion of from 10 to 50 percent by weight. As filler particles alumina, beryllia, zinc oxide, colloidal silica, barium sulfate and/or mixtures thereof come into consideration. Filler particles generally serve as extender and thus contribute to reducing production cost. Furthermore the coefficient of expansion of the bonding assistant can be adapted more properly to that of the support material. By admixing the filler particles also the rheological characteristics are favorably influenced, especially with a view to further processing by screen printing. Apart from this, the filler particles contribute to improving thermal conductivity. To obtain a uniform dispersion, furthermore an antisettling agent and wetting agent in combination with a levelling agent can additionally be added to this binder mixture in a proportion of from 1 to 5 percent by weight. The binder mixture may also contain an admixture of epoxy resin ester and/or acrylic resin and/or melamine formaldehyde resin and/or an alkyd resin component in a proportion of from 5 to 40 percent by weight. The selection of this admixture last but not least depends on the support material used.

As has already been pointed out, the bonding assistant is applied to the support material and cured. Thereby a layer is formed which is suitable either directly after chemical digestion for use as bonding assistant for electroless metallization, or which serves as primer for bonding assistants being known per se such as butadiene acrylonitrile in combination with phenolic or epoxide resin, for example, for copper to be deposited chemically. When applied directly to high temperature resistant thermoplastics such as polyphenylene sulfide, for example, these latter known bonding assistants do not exhibit sufficient adherence.

For direct metallization in autocatalytically functioning baths it is required to chemically digest the bonding assistant. This is done under the action of dilute sulfuric or chromesulfuric acid, under which cavern-type pores form in the layer of bonding assistant from which after nucleation with catalytically active substances such as colloidal palladium, for example, a metal layer grows in the chemical electroless metallizing bath, being anchored in the pores of the layer of bonding assistant. Since these pores for a large part have a direct connection to the filler particles dispersed in the binder and having a substantially better heat conductivity than the organic binder, not only a good anchorage of the grown metal layer, but also a substantially improved dissipation of heat from the metal layer or the conductor path, respectively, is to be expected.

The invention will be illustrated hereinafter with reference to examples.

EXAMPLE 1

The bonding assistant comprising:
10 percent by weight of epoxide resin ester
62 percent by weight of polyurethane resin
5 percent by weight of blocked polyisocyanate
20 percent by weight of talcum
3 percent by weight of Anti-Terra-U (an antisettling agent; Byk-Mallinckrodt Chemische Produkte Gmbh, W. Germany; the salt of a long chain polyamide and a high molecular weight acid ester; see the technical bulletin dated 12/75 and Patentschrift No. 1,157,327 of Oct. 21, 1965)
is applied to degreased phenolic resin hard paper by screen printing, for example. After application, curing of the bonding assistant is effected at 200° C. within 20 minutes.

EXAMPLE 2

The bonding assistant is applied to a degreased glass fiber-reinforced epoxide laminate. The bonding assistant comprises
28 percent by weight of extraneously crosslinked acrylate resin
26 percent by weight of alkyd resin
10 percent by weight of melamine resin
10 percent by weight of epoxy resin ester
23 percent by weight of heavy spar
3 percent by weight of Anti-Terra-U, supra,
Curing is effected at 180° C. within 30 minutes.

EXAMPLE 3

The bonding assistant is applied to a degreased thermoplastic substrate of polyphenylene sulfide. The bonding assistant comprises:
10 percent by weight of epoxy resin ester
20 percent by weight of polyurethane resin
10 percent by weight of blocked polyisocyanate
10 percent by weight of self-crosslinking acrylate resin
30 percent by weight of alumina
17 percent by weight of talcum
3 percent by weight of Anti-Terra-U, supra,
Curing is effected at 200° C. within 20 minutes.

In all three examples suitable dilutions are used for adjusting the proper processing viscosity.

After curing, pull-off tests showed that pulling forces of 3 to 4N/mm$^2$ in a direction perpendicular to the sheeting are required.

What is claimed:

1. A bonding assistant for use in a printed circuit, which consists essentially of a composition containing:
    (a) from 50 to 80 percent by weight of a mixture of a saturated polyester and an isophorone diisocyanate containing masked isocyanate groups;
    (b) from 5 to 40 percent by weight of a mixture of epoxy resin ester and/or acrylic resin and/or melamine formaldehyde resin and/or an alkyd resin; and
    (c) from 10 to 50 percent by weight of filler particles of a particle size less than 15 μm dispersed therein; in which the composition is curable at a temperature of from 180° to 250° C.

2. The bonding assistant according to claim 1 characterized in that the filler particles selected from the group consisting of alumina, beryllia, titanium dioxide, talcum, silicon dioxide, zinc oxide, colloidal silica, barium sulfate and/or mixtures thereof.

3. The bonding assistant claim 1, characterized in that the mixture additionally contains an admixture of antisettling and levelling agent in a proportion of from 1 to 5 percent by weight.

* * * * *